United States Patent

[11] 3,616,318

| [72] | Inventor | Arthur F. Johnson<br>203 Creole Lane, North Gate Urban Farms,<br>Franklin Lakes, N.J. 07417 |
|---|---|---|
| [21] | Appl. No. | 877,018 |
| [22] | Filed | Nov. 14, 1969 |
| [45] | Patented | Oct. 26, 1971 |

[54] ALUMINUM REDUCTION CELL AND PROCESS
9 Claims, 4 Drawing Figs.

[52] U.S. Cl................................................. 204/67,
204/243 M, 204/244
[51] Int. Cl....................................................... C22d 3/12,
C22d 3/02
[50] Field of Search..........................................204/67, 243
M, 244–247

[56] References Cited
UNITED STATES PATENTS

| 2,824,057 | 2/1958 | Thayer......................... | 204/243 R |
| 3,042,604 | 7/1962 | Hegland....................... | 204/244 |
| 3,170,862 | 2/1965 | Hegland....................... | 204/243 RX |
| 3,428,545 | 2/1969 | Johnson........................ | 204/243 RX |

*Primary Examiner*—John H. Mack
*Assistant Examiner*—D. R. Valentine
*Attorney*—Marn and Jangarathis ABSTRACT: The electrolytic cell of the invention comprises a conventional steel potshell lined with carbonaceous potlining, in which are embedded steel collector bars inwardly projecting from the pot sides and outwardly projecting therethrough to make electrical connection with a horizontal cathode bus which at least partly encircles the potshell. However, something less than 30 percent of the collector bars are electrically insulated from the carbonaceous potlining over portions of their lengths which lay between the potshell sides through which they project and the area vertically under the anodes. The collector bars thus electrically insulated are those in areas where the vertical component of magnetic flux from the encircling cathode bus is the greatest. The process of the invention confines the current flow vertically from the downward-facing anode area to the collector bars in only those areas of the pot where vertical magnetic flux in the molten aluminum cathode layer is a maximum. This does not unduly increase resistance to flow of electrical current through the entire potlining surface area and into the collector bars. The collector bars are each preferably designed to draw substantially equal amounts of current.

INVENTOR.
Arthur F. Johnson

BY
Marn & Jangarathis
ATTORNEYS

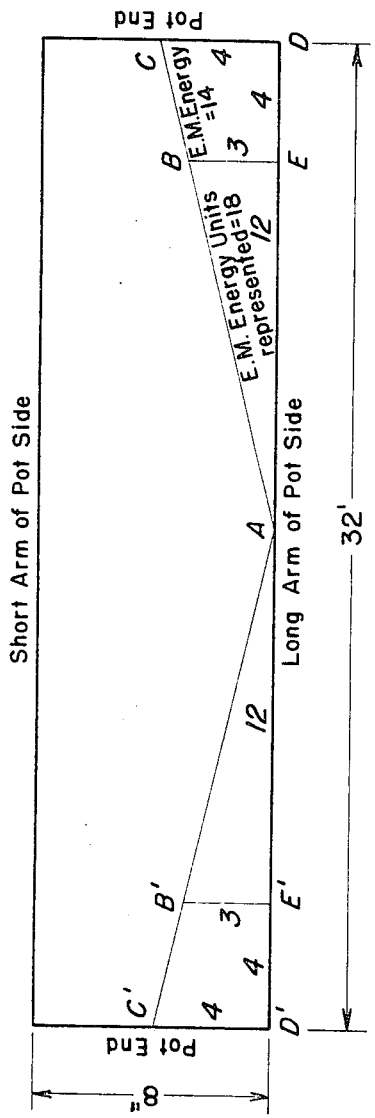
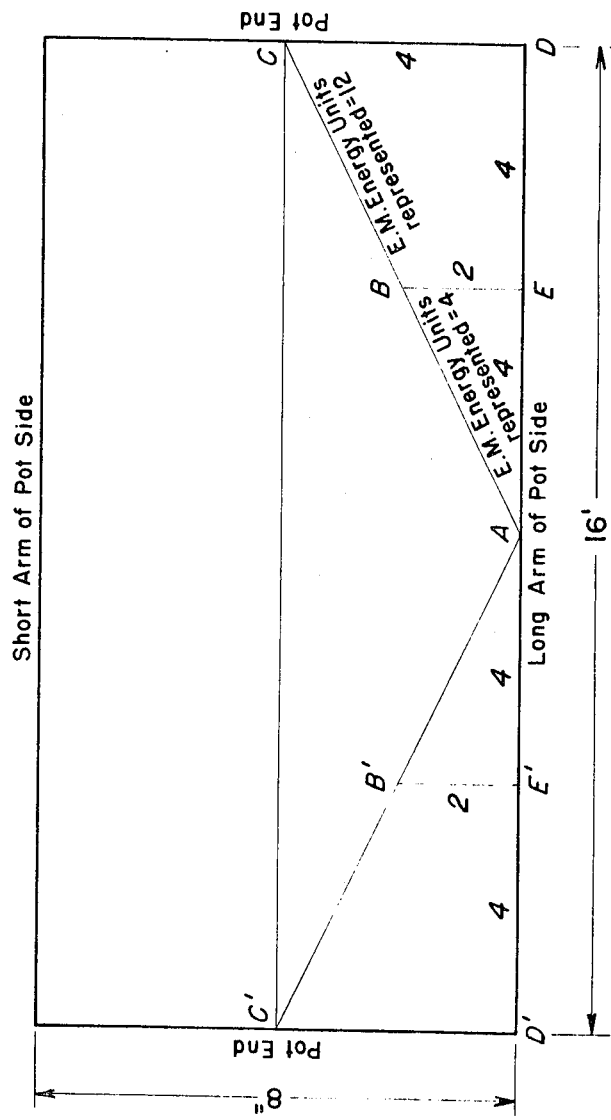

ALUMINUM REDUCTION CELL AND PROCESS

BACKGROUND OF THE INVENTION

1. Field of the Invention

This invention relates generally to the design and operation of electrolytic cells for the production of aluminum. More specifically, the invention relates to the design of such cells in a manner which minimizes magnetic stirring effects which are deleterious to high ampere efficiencies.

To achieve ampere efficiency of 90 percent or more in the Hall-Heroult process of electrolytic reduction of aluminum, certain design features must be incorporated in the cells and, in addition, certain operating practices must be consistently followed. It is well known that 100 percent ampere efficiency is not attained by the following reduction equation in practice:

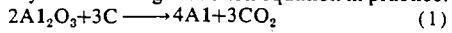
$$2Al_2O_3 + 3C \longrightarrow 4Al + 3CO_2 \qquad (1)$$

One-hundred percent ampere efficiency is not achieved due to the fact that part of the aluminum produced by equation (1) is reoxidized according to the following reoxidation equation:

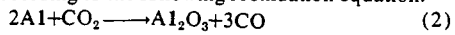
$$2Al + CO_2 \longrightarrow Al_2O_3 + 3CO \qquad (2)$$

Reaction (2) is believed to occur chiefly in the anode-cathode space, where carbon dioxide evolved contacts metallic aluminum dissolved or suspended in the molten cryolite. In pure (stoichiometric) molten cryolite, the ratio of NaF to $AlF_3$ of 1.50. It is now well established that the melt should have an excess of aluminum fluoride compared to that in the mineral cryolite, and so be an acid melt with a ratio of NaF to $AlF_3$ of 1.40 to 1.35 or even less. Such an acid bath dissolves less aluminum and has less free sodium, the latter having the net effect of also reoxidizing aluminum. With little dissolved aluminum, equation (2) is impeded. However, such an acid electrolyte does not dissolve alumina as well as cryolite would. Consequently, modern operating practice consists of stirring alumina into the melt every hour or less, and thereby attempting to keep the alumina content in the range of 4 percent to 6 percent. By the law of mass action, this favors equation (1) being driven to completion, and thus favors higher ampere efficiency.

The most critical factor affecting ampere efficiency is temperature of the melt under each anode from minute to minute. As the temperature rises from about 955° to 1,000° C. the ampere efficiency drops with increasing rapidity from over 90 percent to 50 percent. A heavy "pad" of molten aluminum—8 inches or more—helps to make the overlying melt more uniform in temperature, but the enormous flow of heat to the sides of the reduction cell with such a thick pad causes a waste in power and difficulties with the sides of cells burning out. The best practice involves an aluminum pad only 3-to-5-inches thick and design construction by which the pad is not excessively "heaped up" by electromagnetic effects. With an anode-cathode distance of 1.5 to 2.0 inches, heaping of the pad in places by 0.5 to 1.0 inch or more radically affects the current drawn by the anodes above areas of heaping, and temperature instantly commences to rise at rates on the order of 5° to 50° C. per minute. This becomes faster at the time of anode effect. The electromagnetic heaping contours change with tapping, addition of new anodes, and even with stirring of alumina. Thus, it is impossible to set anodes at the correct height to compensate for heaping. The only satisfactory solution to the problem is a cell design which reduces heaping, as much as possible in all areas of the cell where it occurs. This is done by reducing excessive electromagnetic circulation, which causes the heaping by violently throwing the metal outward. Electromagnetic circulation is due to the reaction of electric currents traveling horizontally in the molten aluminum pad to vertical magnetic flux imposed by the cathode buses, collector bars and to a lesser extent anode buses. This invention is concerned chiefly with cell design features which will reduce vertical magnetic flux and particularly in areas of the cell where the vertical component is a maximum, and, hence, magnetic circulation is a maximum.

2. Prior Art

Reduction of magnetic stirring effects has been attempted by prior workers. In U.S. Pat. Nos. 2,824,057 and 2,874,110, all of the horizontal cathode collector bars are covered with insulation, except in the area directly below the anodes. This minimizes horizontal current flow in the metal and maximizes vertical current flow from anode to cathode. Disclosed alternative embodiments in these patents, involving various shapes of collector bars, have the same effect.

My own earlier patent, U.S. Pat. No. 3,372,105, discloses a similar insulating coating over the same portion of the collector bars, but for the chemical protection thereof.

Of more specific interest is my more recent patent, U.S. Pat. No. 3,385,778. This patent attacks the same problem, but rather than eliminating horizontal currents in the metal, it actually increases them, but reduces overall current density, by using both the end walls and sidewalls of the pot for current collection. Such an arrangement has other benefits, including more even heat dissipation.

It is to be noted that these prior art patents (except U.S. Pat. No. 3,372,105) contain detailed descriptions of the electrical and magnetic factors affecting cell design as they relate to heaping, which need not be incorporated herein except as required for understanding of the present invention.

OBJECTS OF THE INVENTION

A general object of the invention is to greatly decrease electromagnetic circulation and heaping in the operation of a Hall cell, thus improving ampere efficiency.

Various other objects and advantages of the invention will become clear from the following description of embodiments, and the novel features will be particularly pointed out in connection with the appended claims.

THE DRAWINGS

In the accompanying drawings:

FIGS. 3 and 4 are diagrams showing the electromagnetic force in the molten aluminum pad along the "long arm" side of two cells.

SUMMARY AND DESCRIPTION OF EMBODIMENTS

Two of the prior art references given above suggested confining current flow through the molten aluminum pad to a vertical direction, by insulating all of the collector bar lengths not vertically under the anode area. However, a study of this prior art discloses that confining the current in this manner will increase the electrical resistance to travel of the current in the restricted smaller area of the potlining. This invention avoids the disadvantage of this prior art by not restricting current flow through the potlining and into collector bars, excepting in the case of collector bars in areas of the greatest vertical flux. This area is usually only 10 percent to 30 percent of the total potlining area over the collector bars in the pot corners which the cathode bus and cathode current encircles.

Figure 1:
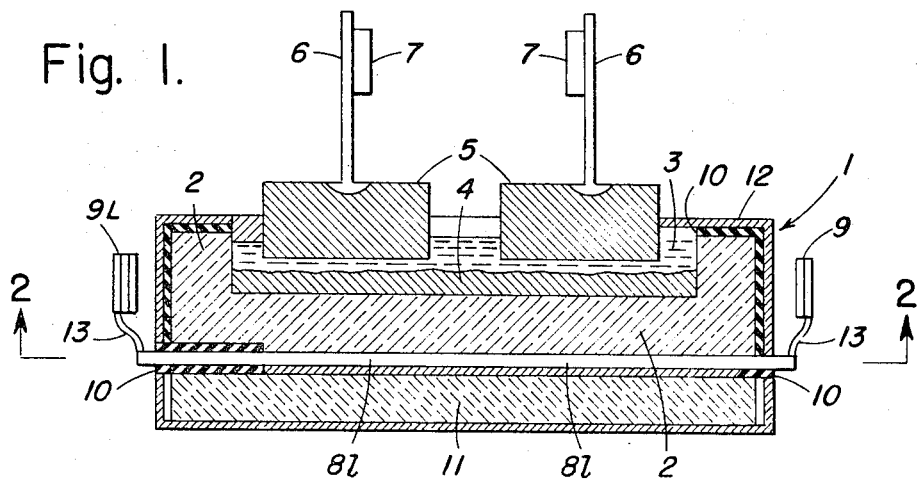
FIG. 1 is a vertical cross section through an aluminum cell employing the invention.

In FIG. 1, a conventional steel potshell 1 is lined with carbonaceous potlining 2 to contain the fused cryolite electrolyte 3 and underlying layer of molten aluminum 4. Conventional carbon anodes 5 are suspended from copper or aluminum bus bars 7 by anode rods 6.

The current path for electrolytic reduction leads from bus bars 7 through rods 6 and anodes 5 into electrolyte 3, aluminum pad 4, and then the potlining 2.

Figure 2:
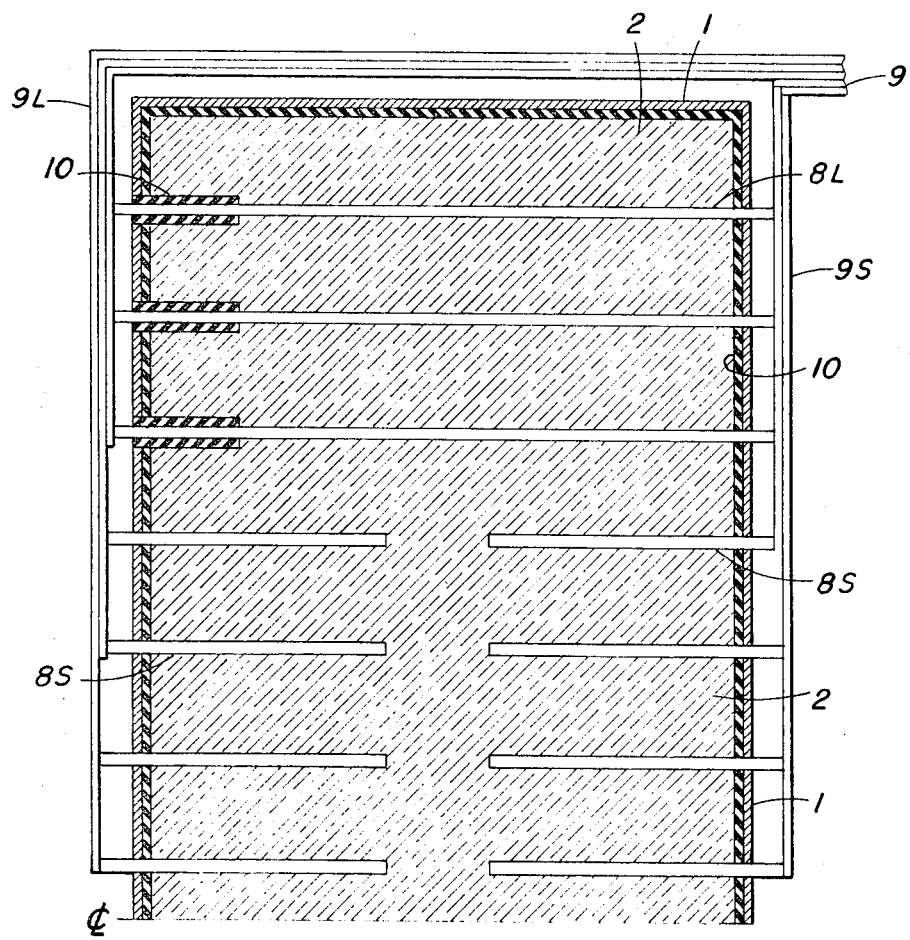
FIG. 2 is a cross-sectional plan view of one-half of a pot along line A—A of FIG. 1.

In any pot, current is collected by steel cathode collector bars buried in the potlining. In the present invention, two types of collector bars are employed, as shown in FIG. 2. In particular, the center of the pot is serviced by a plurality of pairs of short collector bars 8S, and the areas near the ends of the pot have long collector bars 8L. Cathode buses 9 encircle the pot and collect current from the collector bars. The left side of FIG. 2 is the so-called long-arm side, serviced by cathode bus 9L (it is called the long-arm side because it includes the bus going around the end of the pot). The other side of the pot has short-arm bus 9S, and the two meet at the short-arm corner. From this point, current flows to the anodes of the next succeeding pot in the pot line. Leaves are added to the cathode buses 9S and 9L as the current load becomes heavier.

It is to be noted that FIG. 2 shows the pot only down to the centerline; the other half is a mirror image of what is shown, so the complete pot has two short-arm corners and two long-arm corners.

A thin refractory 10 is used to insulate the inside walls of the potshell 1 and the underside of the deck plate 12, while a less refractory heat insulation 11 is used on the bottom of the potshell, principally to conserve heat losses.

The invention consists of using the thin refractory insulation 10 to cover only enough of the long collector bars 8L so that all the current in the two long-arm corners of the pot flows substantially vertically through the molten aluminum pad. By eliminating any horizontal current flow in this particular area, there is no motive force to electromagnetically circulate the melt, even though the electromagnetic flux is greatest at this point (due to the cathode bus and its magnetic field going around a corner).

It has been determined that only a few bars, 10 to 30 percent depending on the size of the cell, need be covered with insulation. The insulation is applied from the shell to a point where the bar goes beneath an anode. As insulation, aluminum silicate is a preferred material, as it is not only effective but is also available in the form of a "paint" which can be brushed on and which dries to an anhydrous form at a relatively low temperature. Optionally, a layer of refractory material can be packed around the insulated portion of the bars.

If all the bars 8 were of the same size, shape and material, bars covered with insulation along a portion of their length would have a different contact resistance with the potlining and, accordingly, would draw differing amounts of current into the cathode collector bars. For purposes of equal heat dissipation and other operating factors, including current flow and electromagnetic effects, this is not desirable for purposes of the present invention. Thus, it is preferred that the bars 8L partially covered with insulation be longer, and the bars 8S not so covered be shorter, so that the total contact resistance and current drawn is approximately equal. Of course, it will be appreciated that making the partially covered bars larger, or of a more conductive material, would be equally effective. However, the arrangement depicted in FIG. 2, wherein the space between coaxial uncovered bars 8S is approximately equal in length to the insulated portions of bars 8L, is a satisfactory solution.

FIGS. 3 and 4 illustrate the surprising degree by which this invention will decrease the electromagnetic energy in the molten metal layer of a cell and, thereby, decrease electromagnetic stirring and heaping of the molten aluminum pad, with the final desired result of improving ampere efficiency in amounts of several percent. It will be understood that some electromagnetic circulation is beneficial in making the alumina content and heat content of the electrolyte more uniform, so the amount of reduction of electromagnetic effects afforded by this invention will in most cases be all that is required or desired.

As shown by the prior art, the motor effect operating to move any given cubic inch of molten aluminum in the metal pad is equal to the mathematical product of the magnetic flux and the electric current passing through said cubic inch. As a practical matter, the vertical magnetic component of the flux from the cathode bus passing through the portion of the molten metal closest to said cathode bus, on the long-arm side of the pot where horizontal currents in the molten metal normally exist, is the cause of the most serious electromagnetic effects. This invention teaches that these harmful motor effects may be diagramatically illustrated by the energy areas under the triangles ABCDE and AB'C'D'E' in FIG. 3, since the magnetic flux increases along the long-arm side going from A to D and A to D', due to increased currents in the cathode bus and in proportion to the width of the cell. The area under ABCDE therefore represents the force acting on a cubic inch of aluminum multiplied by the distance over which that force acts as the aluminum travels from A towards D, as actuated by the amount of motive force and its direction, determined by the left hand motor rule. Since a force acting over distance represents work, or energy, it can be seen that if the collector bars along the lengths ED and E'D' of the long-arm side of either cell in FIG. 3 (or FIG. 4) are insulated from the potlining in which they are embedded, excepting where the bars lie under the anodes, then areas BCDE divided by ABCDE represent the proportion of electromagnetic energy eliminated by performing this insulating improvement. In area BCDE the electromagnetic energy is zero because horizontal currents in the metal pad are eliminated by the insulation on the collector bars. The two diagrams are drawn to illustrate two extremes of shapes, between which shapes most conventional cells lie. Although the dimensions of the cells are shown in feet as 8×32 feet in FIG. 3 and 8×16 feet in FIG. 4, it is the shapes rather than the dimensions which effect the percentages of improvement which can be expected by insulation of the bars near the long-arm corners. Thus, FIG. 3 illustrates that in a pot which is four times as long as it is wide, insulating the collector bars along the long-arm side nearest the pot corners a distance equal to half the cell width reduces the most troublesome electromagnetic effects about 44 percent. This is surprising since only about 12.5 percent of the collector bars (or one-eighth) are in this case given such insulation. Likewise, FIG. 4 illustrates that in a pot which is twice as long as it is wide, insulating the collector bars along the long-arm sides nearest the pot corners a distance equal to half the cell width reduces the most troublesome electromagnetic effects about 75 percent. This is surprising, since only about 25 percent of the collector bars are in this case given such insulation. In a pot shape which is more nearly square, the magnetic effects are more severe since the currents in the metal pad are greater. But, as shown above, this invention is capable of correcting the difficulties.

Various changes in the details, steps, materials, and arrangements of parts, which have herein been described and illustrated in order to explain the nature of the invention, may be made by those skilled in the art within the principle and scope of the invention as defined in the appended claims.

What is claimed is:
1. A cell for electrolytic reduction of aluminum comprising:
   a rectangular metal potshell;
   a conductive potlining within said shell as a cathode and defining the sides and bottom of said cell;
   a plurality of anode electrodes suspended within said cell above the bottom thereof;
   a plurality of cathode collector bars horizontally disposed in said lining below the bottom of said cell parallel to the short ends of said shell and extending through the long sides of said shell;
   a cathode bus at least partly encircling said shell exteriorly thereof and electrically connected to the extending ends of said collector bars;
   electrical insulation covering portions of between 10 and 30 percent of said bars, said covered bars being those nearest the ends of said shell, said covered portions being within said shell and in the corners thereof where the highest vertical magnetic flux exists during operation of said cell, said covering on any said bar extending from said shell to a point where said bar extends beneath one of said anodes.

2. The cell as claimed in claim 1, wherein there are two of said corners and they are the long-arm corners of said cell.

3. The cell as claimed in claim 1, wherein said corners are the corners farthest from the ultimate point or points of cathode current collection in said cathode bus.

4. The cell as claimed in claim 1, wherein said covered bars are longer than bars not so covered, to the extent that all bars have approximately equal contact resistance with said potlining and draw approximately equal amounts of cathode current.

5. The cell as claimed in claim 4, wherein uncovered bars extend toward but not to the centerline of said cell, and said covered bars extend entirely across said cell.

6. The cell as claimed in claim 1, wherein said insulation is aluminum silicate.

7. The cell as claimed in claim 1, wherein said insulation is aluminum silicate surrounded by a layer of refractory, nonconducting material.

8. In the method of reducing metallic aluminum from a fused salt melt containing dissolved alumina in a rectangular electrolytic cell having a carbanaceous cathode lining defining the cell sides and bottom, anode electrodes suspended thereabove, and cathode collector bars buried in said lining below said bottom electrically connected with a cathode bus exterior of and at least partially surrounding said cell, and wherein electric current passing from said anode to said cathode bars causes metallic aluminum to be reduced from said melt and collect in a pool on said bottom, the improvement comprising minimizing the heaping of said aluminum in said pool by insulating said bars from said lining only in areas of high vertical magnetic flux.

9. The method as claimed in claim 8, wherein said bars are insulated from said lining near the long-arm corners of said cell and said bars are not insulated directly under any anode.

* * * * *